Patented Apr. 2, 1940

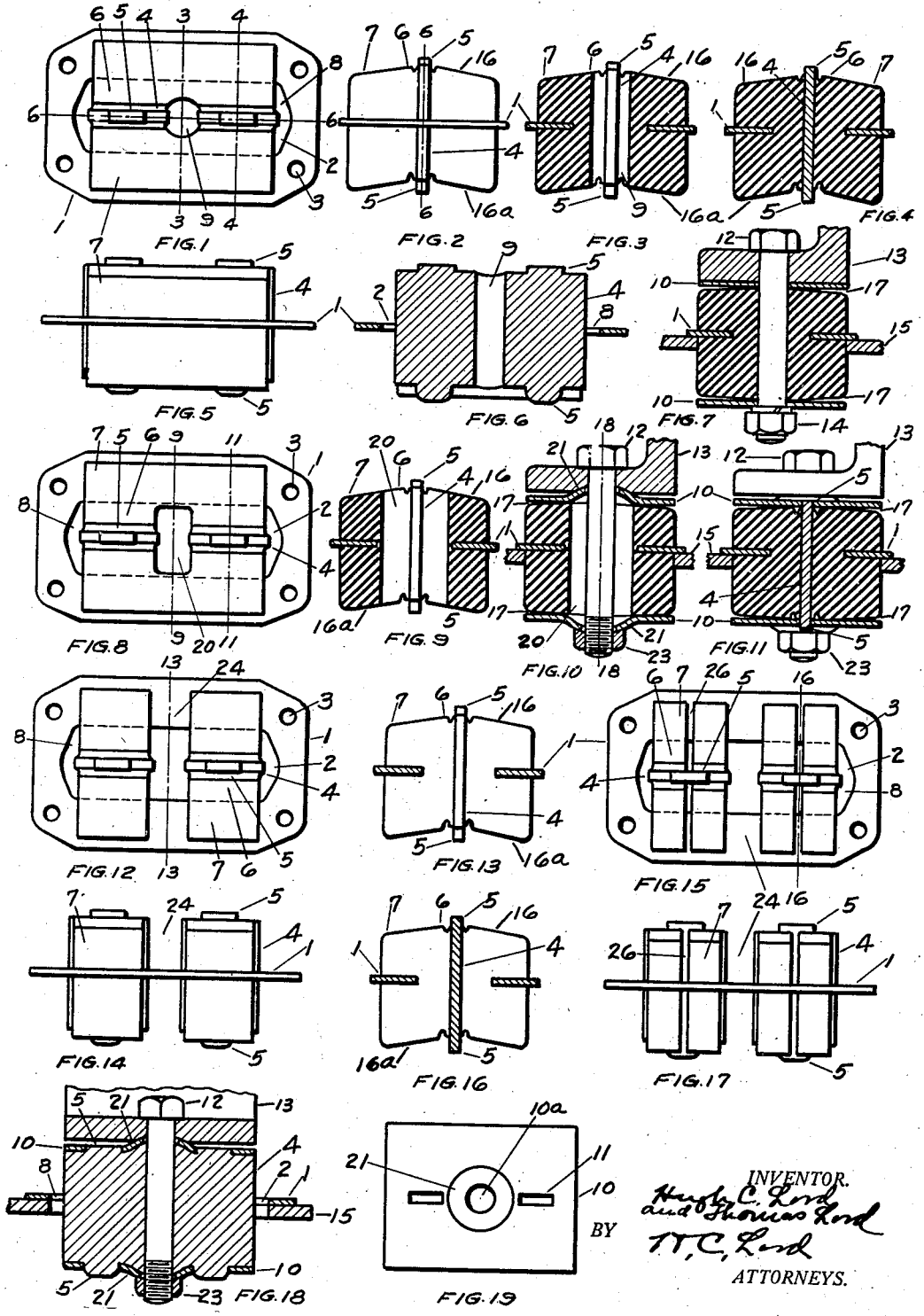

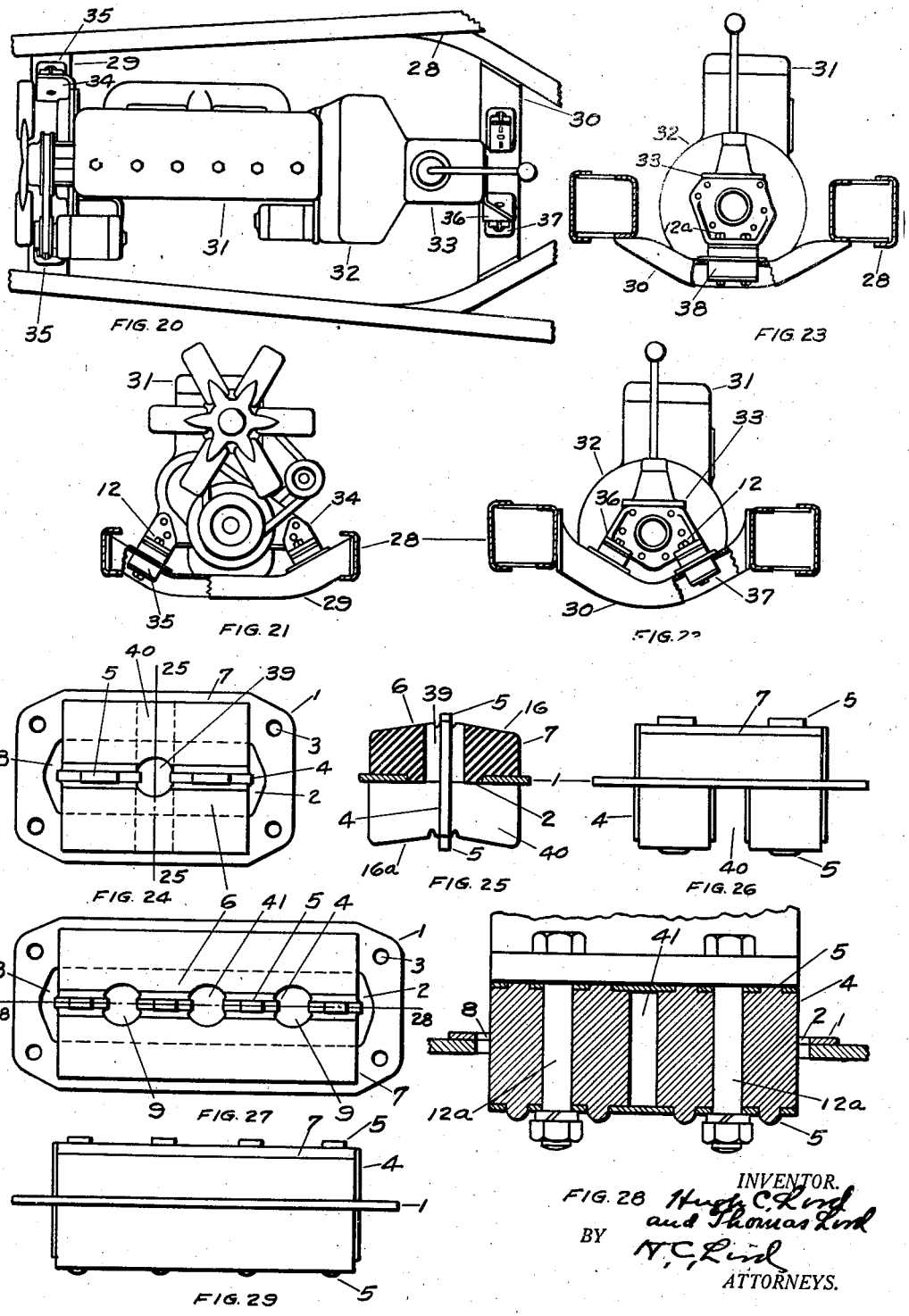

2,195,873

UNITED STATES PATENT OFFICE 2,195,873

CUSHION JOINT

Hugh C. Lord and Thomas Lord, Erie, Pa.;
Thomas Lord assignor to Hugh C. Lord

Application March 5, 1936, Serial No. 67,360

27 Claims. (Cl. 248—358)

This invention relates to cushion joints. Joints have heretofore been made with one member in the form of a plate having an opening therein, and another member extending through the opening at right angles to the plate and spaced from the edges of the opening, and a rubber element bonded to the members, the rubber element as shown overlapping the plate.

The present invention is designed to simplify structures of this type and also to provide a structure which may be readily varied to accommodate different conditions. In many environments it is desirable to have the rate of increase in one direction different from the rate of increase in resistance in another direction. The present invention provides means in a simple manner by which the joint may be arranged to provide a wide range of variation in these characteristics. The structure of the invention also affords a simple means of attachment to the associated parts with which the joint is used. Features and details of the invention will appear from the specification and claims.

A preferred embodiment of the invention is illustrated in the accompanying drawings as follows:

Fig. 1 is a plan view of a joint showing one variation of the invention.

Fig. 2 an end elevation of the joint.

Fig. 3 a section on the line 3—3 in Fig. 1.

Fig. 4 a section on the line 4—4 in Fig. 1.

Fig. 5 a side elevation of the joint.

Fig. 6 a section on the line 6—6 in Figs. 1 and 2.

Fig. 7 a section on the line 3—3 showing the joint in place and secured to associated parts.

Fig. 8 a plan view of a modification of the invention.

Fig. 9 a section on the line 9—9 in Fig. 8.

Fig. 10 a section on the line 9—9 in Fig. 8 showing the joint illustrated in Fig. 8 attached in load carrying position.

Fig. 11 a section on the line 11—11 in Fig. 8.

Fig. 12 a plan view of a further modification.

Fig. 13 a section on the line 13—13 in Fig. 12.

Fig. 14 a side elevation of the structure shown in Fig. 12.

Fig. 15 a plan view of a further modification.

Fig. 16 a section on the line 16—16 in Fig. 15.

Fig. 17 a side elevation of the structure shown in Fig. 15.

Fig. 18 a section on the line 18—18 in Fig. 10.

Fig. 19 a plan view of a snubbing plate detached.

Fig. 20 a plan view of an automobile engine mounted on one of the modifications of joints heretofore illustrated.

Fig. 21 a front view of the engine shown in Fig. 20.

Fig. 22 a rear view of the engine shown in Fig. 20.

Fig. 23 a rear view of the engine with a modified arrangement of mounting.

Fig. 24 a plan view of a further modification of a joint.

Fig. 25 a section on the line 25—25 in Fig. 24.

Fig. 26 a side elevation of the structure shown in Fig. 24.

Fig. 27 a plan view of a further modification.

Fig. 28 a section of a joint as shown in Fig. 27 on the line 28—28, the joint being illustrated in this figure as associated with supporting and supported parts.

Fig. 29 a side elevation of the structure illustrated in Fig. 27.

In the modifications from 1 to 29 there is an outer member in the form of a plate 1, having an elongated opening 2 therein, and securing perforations 3. This plate is usually the supporting plate for the joint but, of course, this arrangement may be reversed. The inner member is formed of a plurality of plates 4 extending at right angles to the plate 1 and through the opening 2. These members 4 are usually the supported plates and thus arranged in a vertical direction, but again, they may be arranged to support the load. Each of the plates 4 have tenon projections 5.

A rubber element 6 is bonded to the inner members and has a portion 7 which overlaps the plate 1 both above and below the plate, and the overlapping surfaces of plate 1 and the overlapping rubber are bonded together, perferably in vulcanization. The openings 2 in the plate extend outwardly from the outer edges of the members 4 forming a free endwise space 8. The rubber member is provided with a vertical opening 9 extending entirely through it between the vertical members 4. In use, snubbing plates 10 having openings 11 (see Fig. 19) are arranged on the ends of the plates 4, the tenon projections 5 extending into or through the openings 11. A bolt 12 extends through the opening 9 through openings 10a in the plates 10 and through a supporting bracket 13. The bolt is set up with a nut 14. The bolt, therefore, completely assembles the joint with the snubbing plates and at the same time forms a means of attachment of the joint to the bracket or other supported or supporting parts. The plate 1 is secured to the supporting part 15 which may be a bracket or cross member of an automobile.

It will be noted that the rubber of the joint initially has the upper face inclined at 16 giving the structure a convex outline in cross section, and the lower surfaces 16a are inclined from the central member giving the bottom of the rubber element a concave outline in cross section. Under load as shown in Fig. 7 these inclinations are flattened out and are so proportioned as to provide a clearance space 17.

In normal condition the load is sustained with the rubber element which is in the area defined by the opening 2 as under direct shear, and the overlapping portions 7 of the rubber forms a supporting wall for this rubber in shear. This portion 7 also is interposed between the snubbing plates and the plate 1 so that with any abnormal pressure on the inner members the snubbing plates are brought into engagement with surfaces 16 or 16a directly over the wall portions 7 of the rubber. This puts this wall portion 7 under direct compression and therefore changes the thrust resistance of the joint. In many environments this is of particular value because it permits of carrying the load under normal conditions in shear and, on the other hand, confining the movement to as close limits as may be desired, this being controlled largely by the clearance spaces 17.

In some instances it may be desirable to snub the action within very close limits and under such circumstances it may be desirable to reinforce the portions of the rubber in the wall 7 or change its character from the shear portion of the rubber element. This may be done by changing the quality of the rubber so that this wall portion of the rubber may be denser or the wall portion of the rubber member reinforced by including loose fibres therein, thus increasing its resistance to compression. This variation in stiffness of the side wall 7 increases the resistance to movement of the central members in a direction at right angles to the wall 7 to a greater extent than it increases its resistance to movement parallel to said wall 7, thus giving a variation desirable under most conditions.

It is noted that in this structure the rubber is under shear not only in response to pressure thrust in a vertical direction but is in shear in one plane laterally. This is a very desirable arrangement in that in many environments such as in relation to an instrument having rotating parts, the inner plates 4 may be placed in the plane at right angles to the axis of rotation and under these conditions not only the unbalanced conditions of the instrument are accommodated through shear action of the rubber but also torque vibrations manifested in the plane of the inner member may also be resisted by rubber in shear. This is important in that by placing the rubber in shear so as to accommodate the different vibratory actions of the joint the vibratory period of the joint may be made very low and will thus be out of step with instruments having ordinary vibration periods.

In accommodating the joint to instruments having varying characteristics, it is often very important and very desirable to vary the lateral resistance relatively to the vertical resistance. Thus it may be desirable to oppose torque thrust with a softer cushioning effect than the vibratory thrusts in a vertical direction, and in order to dampen various instruments these relations often are very critical. The present structure affords means where these different variations may be readily met. In the modification shown in the various following figures different variations of structure are provided to vary the relative resistance to vertical and side-wise thrusts.

*Fig. 8.*—The vertical opening 20 in the rubber is not only of sufficient size to receive the bolt but extends to an edge of the opening 2. This extension of the opening reduces the sidewise shear resistance in the plane in the inner members 4 to a greater degree than it changes the vertical load carrying capacity. This is because the opposing edges of the rubber in the opening 20 do not oppose side movement to the extent of the rubber at each side of the opening 9. Further, the wall portions 7 are maintained intact and while there is a slightly less snubbing resistance in that portion of the wall directly outside of the opening 20 this reduction is comparatively slight.

In all modifications the snubbing plate may be flat throughout its surface as indicated in Fig. 7 or the snubbing plates may have slight spherical projections 21. This projection may be accomplished by shaping the plate through a stamping action and this spherical surface extends into a cup or corresponding spherical depression in the bracket 13. The spherical projection 21 in the lower plate is taken care of by spherical depression in the face of a nut 23 or this may be accomplished by depression in the face of the head of the bolt when the bolt is reversed. This spherical connection permits the snubbling plate to accommodate itself so as to provide an equalization of the snubbing spaces 17 at each side of the joint. Where a flat snubbing plate is used, and it so happens that the brackets or supports are slightly out of line the tendency is to tilt the plate 10 slightly, thus reducing the clearance space 17 at one side and increasing it at the other. In many environments this clearance space is measured in thousandths, sometimes being practically eliminated in order to get greater stability without losing the major shear action of the rubber and consequently this equalization becomes important. By providing the spherical surfaces, the plate can readily accommodate itself as the parts are clamped up to accommodate any misalignment of the support 15 and the bracket 13.

In Fig. 12 a further modification is shown in which the rubber is severed completely through the joint at 24. This, as compared with the structure in Fig. 8, reduces the resistance to side thrust to a greater extent than the resistance to vertical thrust and thus gives a variation with a possibility of accommodating critical vibratory period that may not be entirely satisfied by either the structure of Fig. 1 or Fig. 8. It will be noted here that the rubber both above and below the plate 1 is slotted at 24.

In Figs. 15 to 17 the structure shown in Fig. 12 is further modified by slotting the rubber at 26 crosswise of the joint and extending as shown from the sides of the rubber to the faces of the inner plates. This slotting again reduces resistance to side thrust to a greater extent than it reduces the resistance to vertical thrust and gives a still further variation.

It will be understood also as to each of these structures that the resistance to vertical thrust may be increased by extending the rubber above and below the plate 1 and the added resistance to vertical thrust by such extension is greater than the added resistance to sidewise thrust and consequently this gives an added variation which, of course, is manifested in the slotting structures of Figs. 8 to 17 in that if the load resisting capacity is maintained in each of these structures it will be necessary to extend the up and down dimension of the rubber to compensate for the reduction in resistance incident to the side slotting of the rubber.

In Figs. 20 to 22 there is shown a typical application of these mountings to an automobile engine. 28 marks the side members of the frame, 29 a forward cross member, 30 a rear cross member. An engine 31 has the usual multiple cylinders, and is provided with a bell housing 32 and transmission case 33 united as a unit. Brackets 34 are arranged at the front of the engine and mountings 35, which may be any of the modifications described, are inserted between the brackets 34 and cross member 29. Similarly joints 37 of any of the modifications may be inserted between brackets 36 at the rear of the transmission and the cross member 30.

In Fig. 23 a single rear joint 38 is used between the cross member 30 and an extension on the transmission 33. In this instance a modification hereinafter described having plural bolts 12a is used for securing the joint and assembling the parts.

In this arrangement of joints it will be noted that the load is carried largely in shear in the vertical direction and that the joints respond to the torque thrusts in shear by the side movement of the central member. It is desirable in many instances to incline the joints as shown, giving slightly greater stability and responding to the torque variations more nearly sidewise of the joints than where the joints are arranged where the supporting plates 1 are horizontal. However, where a single joint is used it becomes tangent to the torque thrust with the supporting plate 1 in a horizontal position.

In Figs. 24 to 26 there is shown a further modification of the joint which has been heretofore described in that an opening 39 is provided above the plate 1 similarly to the opening 9 but a slot 40 extending entirely across the rubber is provided below the plate 1. This in many instances is a desirable arrangement in that it provides a maximum of snubbing capacity at the load side of the joint, and any material reduction in sidewise resistance due to the cross slot at the bottom and the reduced rebound snubbing is not ordinarily as detrimental as the reduced snubbing on the load side of the joint.

In Figs. 27 to 28, there is shown a further modification in which the number of plates 4 are increased. As here shown, four plates are used. This plurality arrangement makes is possible to extend the joint indefinitely without changing its main characteristics or its manner of assembly. When four inner plates are used it is convenient to use two bolts 12a for attachment and assembly. The perforations 9 are used for the bolts and a further perforation 41 is provided between the two inner plates. It will be readily understood that the opening 41 may be omitted and a single plate used between the two bolts 12a and it will be also understood that the number of plates 4 under this arrangement may be extended indefinitely. Similar designating numerals have been used throughout for the inner and outer plates as they are substantially the same in structure. The main variation in the modifications being in the arrangement of the rubber with relation to these plates, and it will also be understood that with each modification such as the modification shown in Figs. 26 to 28, the different slotting of rubber as shown on the different modifications may be used to vary the resistance characteristics of the joint and to change the relative characteristics of the joint.

It will be noted that along the faces of the plates forming the inner member the rubber element is grooved so as to form a thin edge at the terminus of the bond from strain tending to start a separation of the bond. This is of particular value along flat faces where a localizing of the tear is possible. Preferably this thin edge is provided by grooving the face slightly adjacent to this bonded edge. In this way the mass of rubber may be maintained in substantially the same amount as though the groove were eliminated and if the face of the rubber is utilized for any functional purpose the groove does not disturb this.

What is claimed as new is:

1. In a cushion joint, the combination of an outer member forming sides spaced apart to form an opening between the sides; a plurality of inner members in the projected area of the opening spaced from the sides; an element of resilient material bridging the spaces between the sides and the inner members and permanently united with said members; and an attaching bolt between the inner members.

2. In a cushion joint, the combination of an outer member forming sides spaced apart to form an opening between the sides; a plurality of inner members in the projected area of the opening spaced from the sides; an element of resilient material bridging the spaces between the sides and the inner members and permanently united with said members; an attaching bolt between the inner members; and means secured by the bolt maintaining the relation between the inner members.

3. In a cushion joint, the combination of an outer member forming sides spaced apart to form an opening between the sides; a plurality of inner members in the projected area of the opening spaced from the sides; an element of resilient material bridging the spaces between the sides and the inner members and permanently united with said members; a bar having openings receiving the ends of the inner members; and a bolt between the inner members clamping the bar and inner members together.

4. In a cushion joint, the combination of an outer member forming sides spaced apart to form an opening between the sides; a plurality of spaced apart inner members in the projected area of the opening spaced from the sides; an element of resilient material bridging the spaces between the sides and the inner members and permanently united with said members, said element presenting snubbing surfaces; a snubbing member on the inner members; and a bolt clamping the snubbing member in place.

5. In a cushion joint, the combination of an outer member having a joint opening; an inner member in the projected area of the opening; an element of resilient material bridging the space between the members and permanently secured thereto, said element having a snubbing surface; a snubbing member secured to the inner member engageable with the snubbing surface; an attaching member; and a rocking connection between the attaching member and the snubbing member.

6. In a cushion joint, the combination of an outer member forming sides spaced apart to form an opening; an inner member in the projected area of the opening between the sides; and an element of resilient material bridging the spaces between the sides and the inner member and permanently united with the members, the element in the free space between the sides and inner member having transverse slots.

7. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at least at one face side of the plate.

8. In a cushion joint, the combination of an outer member in the form of plates spaced apart forming sides of an opening; an inner member in the projected area of the opening between the sides; and an element of resilient material bridging the spaces between the sides and the inner member and overlapping the outer member at both faces of the sides of the opening and permanently united with the members, the element in the free space between the sides and the inner member having transverse slots at both face sides of the plate.

9. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at least at one face side of the plate, said slots extending into the overlapped portion.

10. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at both face sides of the plate, said slots extending into the overlapped portion.

11. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at least at the bottom face side of the plate.

12. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at the bottom face side of the plate only.

13. In a cushion joint, the combination of an outer member in the form of plates spaced apart forming sides of an opening; an inner member in the projected area of the opening between the sides; and an element of resilient material bridging the spaces between the sides and the inner member and overlapping the outer member at the sides of the opening and permanently united with the members, the element in the free space between the sides and the inner member having transverse slots at the bottom face side of the plate only, said slots extending into the overlapped portion.

14. In a cushion joint, the combination of an outer member in the form of plates spaced apart forming sides of an opening; an inner member in the projected area of the opening between the sides; and an element of resilient material bridging the spaces between the sides and the inner member and overlapping both faces of the wall at the sides of the opening and permanently united with the members, the element in the free space between the sides and the inner member having transverse slots above and below the face sides of the plate, the slots below the bottom face side of the plate being more extended than on the upper face side of the plate.

15. In a cushion joint, the combination of an outer member in the form of plates spaced apart forming sides of an opening; an inner member in the projected area of the opening between the sides; and an element of resilient material bridging the spaces between the sides and the inner member and overlapping both faces of the wall at the sides of the opening and permanently united with the members, the element in the free space between the sides and the inner member having transverse slots above and below the face sides of the plate, the slots below the bottom face side of the plate being more extended than on the upper face side of the plate and extending into the overlapped portion below the plate.

16. In a cushion joint, the combination of an outer member forming sides spaced apart to form an opening; a plurality of inner members in the projected area of the opening between the sides said inner members being spaced apart; and an element of resilient material bridging the spaces between the sides and the inner members and permanently united with the members, the element in the free space between the sides and inner members having transverse slots extending over the space between the inner member units.

17. In a cushion joint, the combination of an outer member in the form of plates spaced apart forming sides of an opening; a plurality of inner members in the projected area of the opening between the sides said inner members being spaced apart; and an element of resilient material bridging the spaces between the sides and the inner members and overlapping the outer member at the sides of the opening and permanently united with the members, the element in the free space between the sides and the inner members having slots extending from the space between the inner members through the part of the element bridging the space between the members at least at one face side of the outer member, said slots extending into the overlapped portion of the element.

18. In a cushion joint, the combination of an outer member forming sides spaced apart to form an opening; an inner member in the projected area of the opening between the sides; and an element of resilient material bridging the spaces between the sides and the inner member and permanently united with the members, the element in the free space between the sides and inner member having transverse slots, said slots extending from the faces of the inner member.

19. In a cushion joint, the combination of an outer member forming sides spaced apart to form an opening; an inner member in the projected area of the opening between the sides; and an element of resilient material bridging the spaces between the sides and overlapping the faces of the outer member at the sides of the opening and the inner member and permanently united with the members, the element in the free space between the sides and inner member having transverse slots, said slots extending across the portion of the element bridging the space between the members and into the overlapped portions of the element.

20. In a cushion joint, the combination of an outer member forming sides spaced apart forming an opening between the sides; a plurality of members in the projected area of the opening spaced from the sides, said members being spaced apart providing an opening therebetween; an element of resilient material bridging the spaces between the sides and the inner members and permanently united with said members, said element presenting snubbing surfaces; and a snubbing member secured on the inner members and securing the inner members relatively to each other and adapted to engage said snubbing surfaces.

21. In a cushion joint, the combination of a side member; a resilient member projecting into free space from said side member, the projected portion of the resilient element being slotted; and a second member spaced from the first member and bridging the slots and permanently united with the resilient member.

22. In a cushion joint, the combination of an outer member in the form of the plate; a resilient element permanently secured on the face of said plate and extending edgewise thereof into free space, said resilient element being slotted in the free space and crosswise of the plate; and a member permanently secured to the resilient element and bridging the slots.

23. In a cushion joint, the combination of an outer member in the form of a plate; a resilient element permanently secured to both faces of the plate and extending edgewise thereof into free space, said resilient element being slotted in the free space and crosswise of the plate; and a member permanently secured to the resilient element and bridging the slots.

24. A cushion mounting comprising a plate having an elongated edge; a rubber member overlapping the plate and bonded thereto and projecting edgewise therefrom into free space, at least some of the rubber in the overlapping portion forming a wall extending perpendicularly from the plate, the rubber of the wall along the elongated edge being reinforced to make it more resistant to deformation than the projecting rubber at least a part of the ends of the projecting rubber being free from reinforcement; and a member connected to the projecting rubber.

25. A cushion mounting comprising a plate having an elongated edge; a rubber member overlapping the plate and bonded thereto and projecting edgewise therefrom into free space, at least some of the rubber in the overlapping portion forming a wall extending perpendicularly from the plate, the rubber of the wall along the elongated edge being reinforced with fiber to make it more resistant to deformation than the projecting rubber at least a part of the ends of the projecting rubber being free from reinforcement; and a member connected to the projecting rubber.

26. In a joint, the combination of a supporting and a supported member; and a resilient element bridging the space between the members, said element being bonded to a face of one of the members facing the opposite member and having a narrow groove in its face providing a thin edge at the termination of the bond, the groove being narrower than the element.

27. In a joint, the combination of supported and supporting members; and a rubber element bridging the space between said members, one of the members presenting a flat face to which the rubber element is bonded, said rubber element being provided with a narrow groove along the side of the flat face providing a thin edge at the termination of the bond.

HUGH C. LORD.
THOMAS LORD.